May 1, 1928.　　　　　　　　　　　　　　1,667,768

P. N. BOSSART

ELECTRICAL APPARATUS

Filed May 21, 1925　　　　4 Sheets-Sheet 2

INVENTOR:
P. N. Bossart,
BY
His ATTORNEY

May 1, 1928. 1,667,768
P. N. BOSSART
ELECTRICAL APPARATUS
Filed May 21, 1925   4 Sheets-Sheet 3

INVENTOR:
P. N. Bossart,
BY A. L. Kendall
ATTORNEY

May 1, 1928.
P. N. BOSSART
1,667,768
ELECTRICAL APPARATUS
Filed May 21, 1925    4 Sheets-Sheet 4
Fig. 6.    Circuit 1.
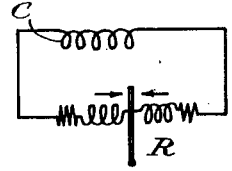
Fig. 7.    Circuit 2.
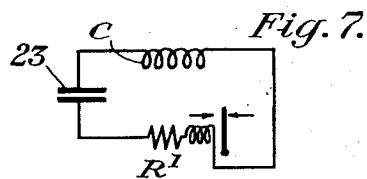
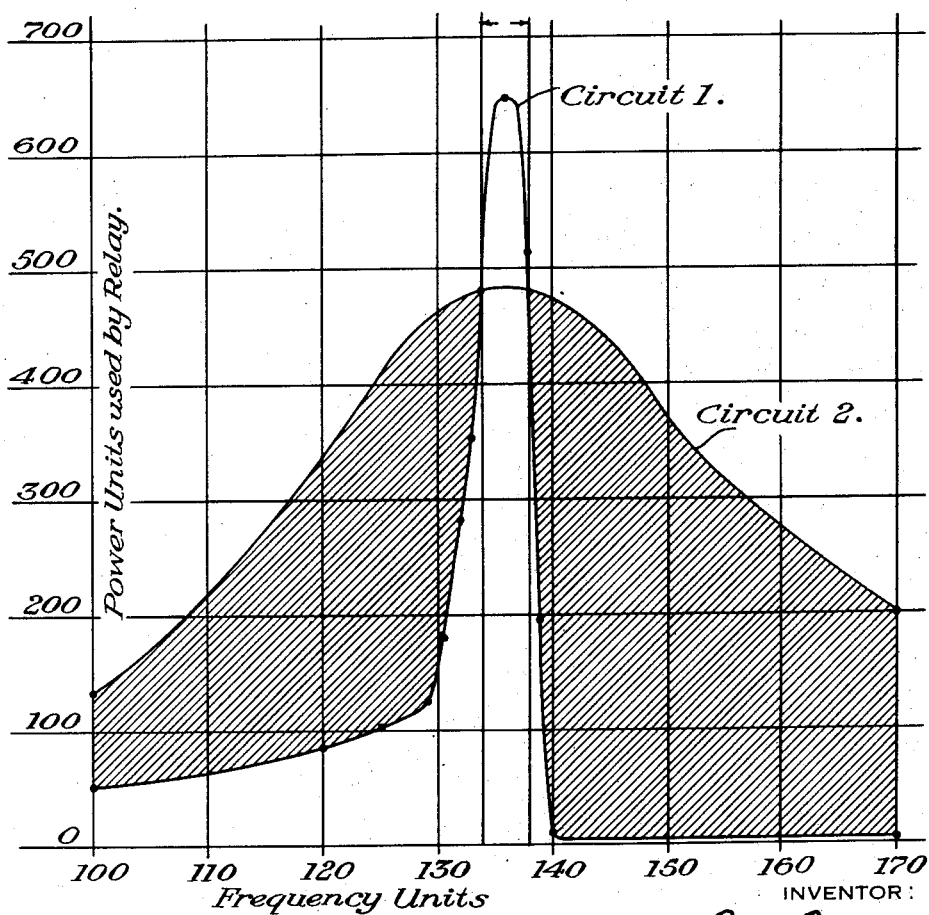
Fig. 8.
INVENTOR:
P. N. Bossart,
BY A. L. Verrill
His ATTORNEY Patented May 1, 1928.

1,667,768

UNITED STATES PATENT OFFICE.

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL APPARATUS.

Application filed May 21, 1925. Serial No. 31,983.

My invention relates to electrical apparatus, and has for an object the provision of novel and improved means for tuning an electrical circuit.

I will describe one form of apparatus embodying my invention and will then point out the novel features thereof in claims.

Figure 1:
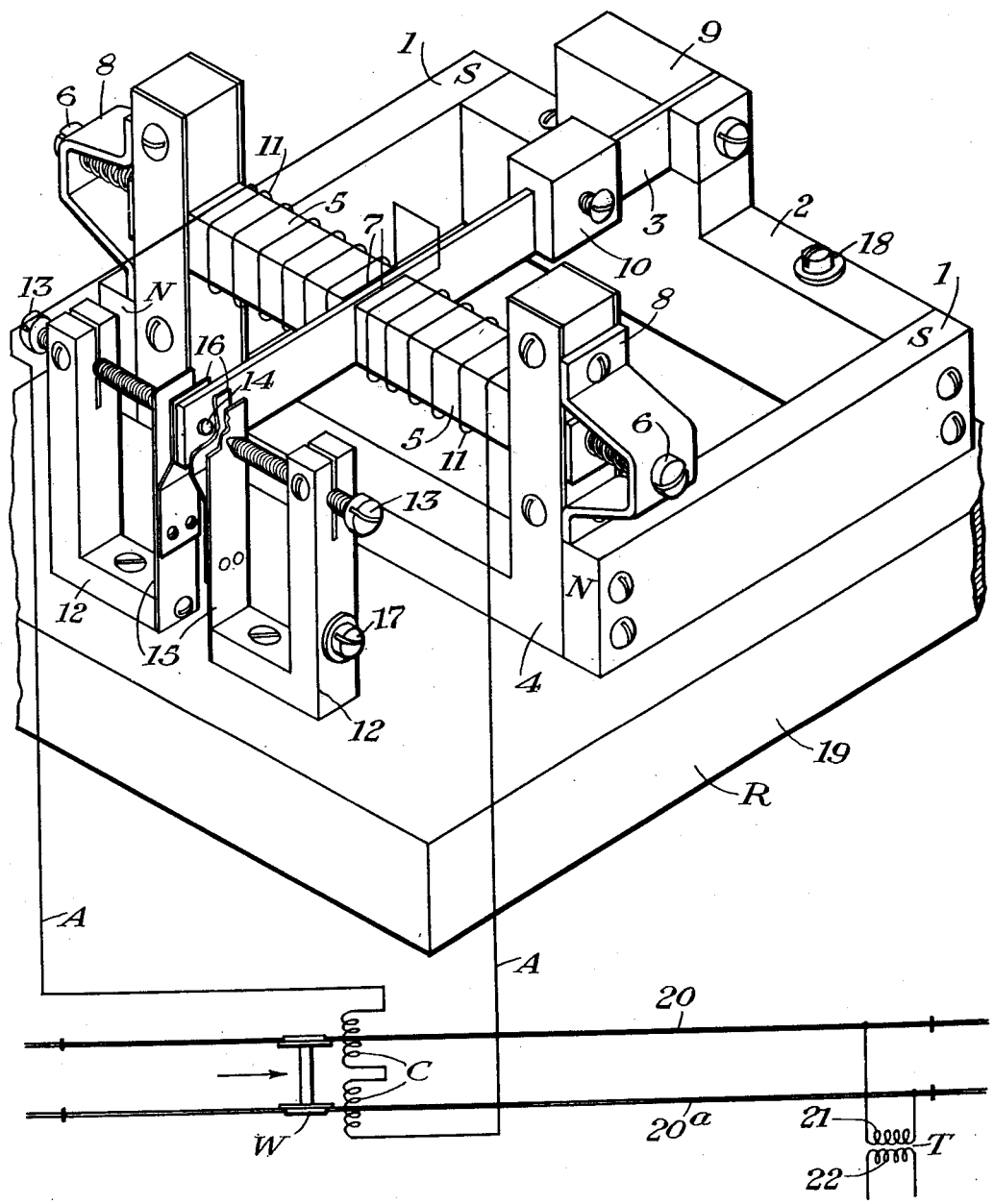
Figure 2:
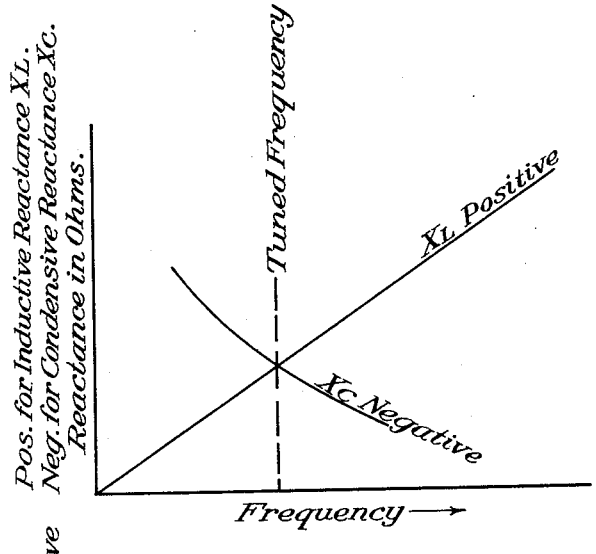
Figure 3:
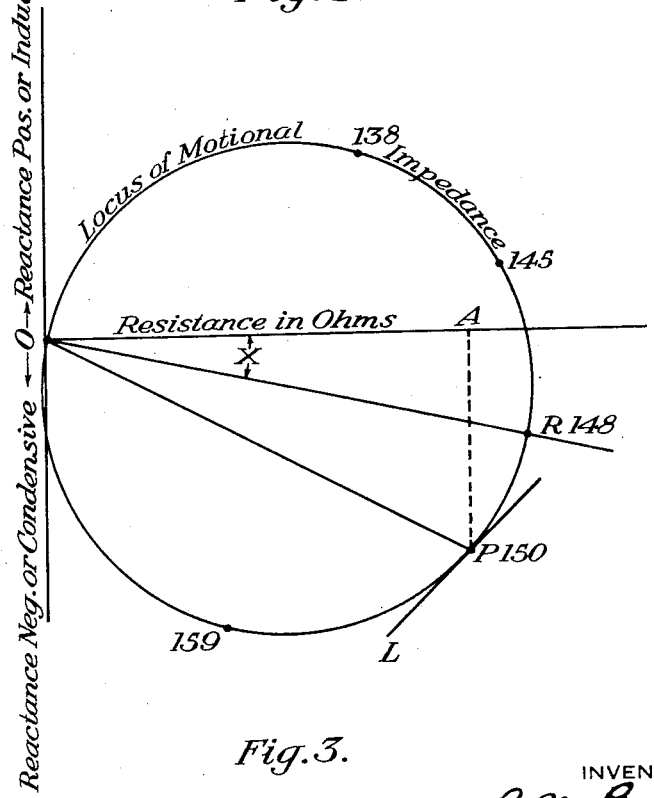
Figure 4:
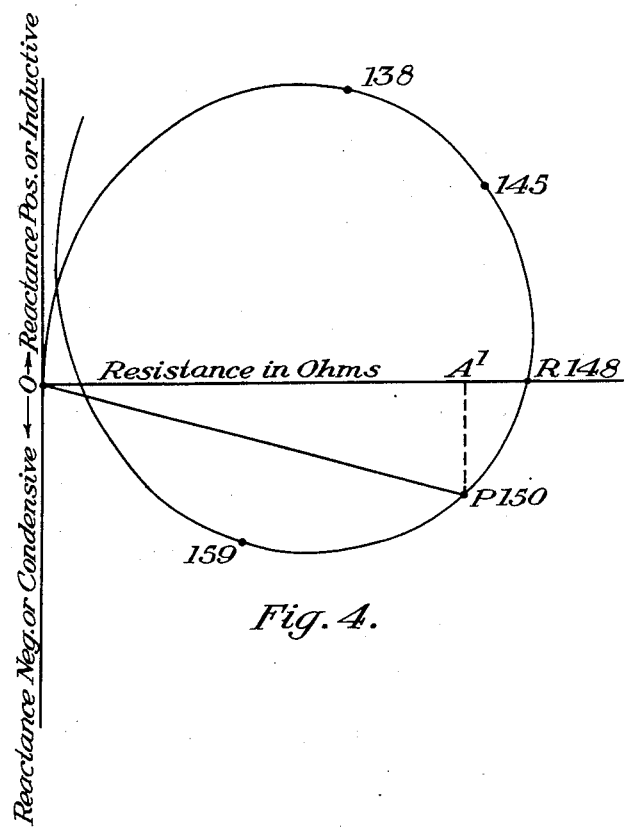
Figure 5:
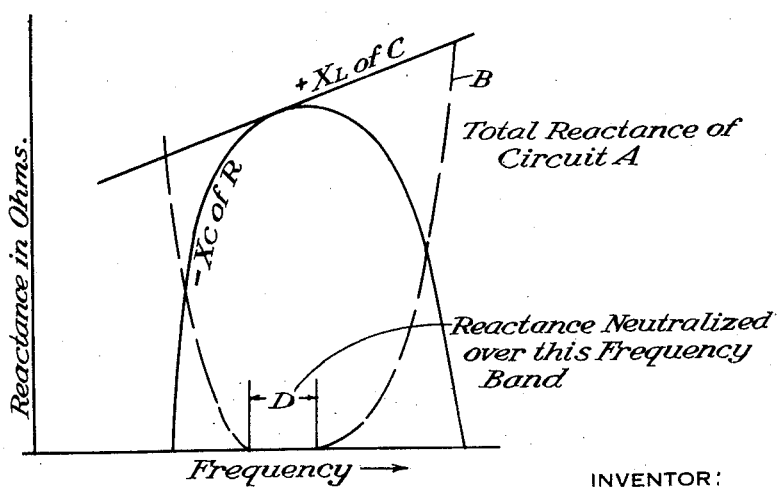

In the accompanying drawings, Fig. 1 is a view partly diagrammatic and partly in isometric projection showing one form of apparatus embodying my invention. Fig. 2 is a chart showing the characteristics of a circuit having capacity and reactance in series. Fig. 3 is a chart showing the characteristics of a vibrating electromagnetic device. Fig. 4 is a chart similar to Fig. 3 but showing the characteristics of a vibrating electromagnetic device when the total impedance of the device is taken into consideration. Fig. 5 is a chart showing the characteristics of the circuit shown in Fig. 1. Fig. 6 is a view showing in diagrammatic form the circuit for the relay R shown in Fig. 1. Fig. 7 is a view showing in diagrammatic form a circuit having a condenser and an inductive reactance in series. Fig. 8 is a chart showing the relative characteristics of the two circuits shown in Figs. 6 and 7.

Referring first to Fig. 1, the reference character R designates a vibrating electromagnetic device which, as here shown, is in the form of a relay. This device is provided with a circuit A which includes the winding 11 of the device R and a coil C to which alternating current is at times supplied by induction. As here shown, the relay R is mounted on a railway vehicle W and the coil C is in two windings which are in inductive relation with the two track rails 20 and 20ª, respectively. Alternating current is at times supplied to the track rails 20 and 20ª by a transformer T, the secondary 21 of which is connected across the rails and the primary 22 of which is connected with a source of alternating current which is not shown in the drawing. The coil C is mounted in front of the forward wheels of the vehicle W, so that when alternating current is supplied to the track rails by the transformer T the circuit A is supplied with alternating current which is created inductively in the coil C.

The relay R in the form here shown, comprises a base plate 19 supporting two permanent magnets 1, 1. The two south poles of these magnets are connected by a back strap 2, and the two north poles are connected by a front yoke 4, the legs of which project upwardly and carry two confronting sliding pole pieces 5, 5. The winding 11 of the relay is located on these pole pieces. Located between the pole pieces 5, 5 is a steel vibrating armature 3, one end of which is attached to a block 9 which projects upwardly from the back strap 2. The other end of the armature 3 coacts with fixed contact members as hereinafter explained. The armature 3 is provided with a slidable weight 10 for the purpose of tuning the armature to mechanical resonance at the desired frequency. The air gaps 7 between each pole piece 5 and the armature 3 are adjusted by means of screws 6 which pass freely through brackets 8 mounted on the yoke 4 and thread into tapped holes in the pole pieces 5. Fixed to the base plate 19 on opposite sides of the free end of armature 3 are a pair of contact supports 12. Attached to the inner or confronting ends of these supports are relatively stiff springs 15 which project upwardly and are disposed on opposite sides of the armature. Each of these springs 15 carries a lighter spring 16 which is spaced from the fixed spring and coacts with a contact button 14 attached to the corresponding face of the armature 3. It will be seen, therefore, that as the armature 3 vibrates it will alternately engage with the two light contact springs 16. Terminal posts 17 on each contact support 12, and 18 on back strap 2 may be provided for connecting the controlled circuit with the relay.

Heretofore it has been customary to tune a circuit to electrical resonance by a condenser which neutralizes the inductive reactance of the circuit. The capacity of a static condenser does not change with change of frequency, however, and so its negative reactance decreases directly with increase of frequency, while the static inductive reactance of the remainder of the circuit increases approximately directly with increase of frequency. Consequently, a balance of the two reactances is possible at only one frequency on either side of which the reactances diverge rapidly. This is illustrated in the chart forming Fig. 2 of the accompanying drawings where inductive reactance $X_L$ and condensive reactance $X_C$ are plotted against frequency.

If the electrical impedance of a vibrating electromagnetic device, such as the device R, of Fig. 1, is investigated throughout the frequency range on both sides of its natural frequency, it will be found that its reactance due to motion of the armature changes very considerably in this range, and with certain designs this reactance may be condensive for some frequencies and inductive for other frequencies. At one frequency it may possess no total reactance. At another higher frequency the total reactance again becomes zero. According to my present invention I so adjust the parts of the circuit with relation to each other that the inherent reactance of the vibrating device due to its motion is of such value and sign as to neutralize or substantially neutralize the net reactance of the remainder of the circuit. Since the motional condensive reactance throughout a certain frequency range increases with increase of frequency, which is the same way in which the inductive reactance changes, a neutralization may be maintained over a narrow frequency band better than with static capacity.

The way in which the motional impedance of a vibrating electromagnetic device varies with frequency is illustrated in Fig. 3. A line drawn from the origin O to any point on the circle of this view gives the motional impedance at the frequency corresponding to such point. The frequencies are shown by numbers on the circumference of the circle. For example, the line O—P shows that for a frequency of 150 units the motional impedance consists of O—A resistance units and of A—P negative reactance units. By proper design, the size and diametral angle of depression X may be varied to a considerable extent, so that desired values of reactance may be obtained. It should be noted that the point P is quite close to the resonant frequency which is designated R, and, as here shown, is 148; and also that at the point P the capacity reactance increases with increase of frequency, thus tending to preserve neutralization.

The vibrating device, however, has impedance other than motional impedance, so that the total impedance is the sum of the two and may be represented by the chart shown in Fig. 4.

Referring to Fig. 4, the desired condition is to operate the vibrating device at a point such as P, that is near the resonant point R of the device, and that is so chosen that the condensive reactance A'—P at the operating frequency will balance the inductive reactance of the remainder of the circuit. Then for small changes of frequency the condensive reactance varies at approximately the same rate as the inductive reactance and also in the same direction, so that the total reactance is maintained at substantially zero. According to Fig. 4, the armature 3 of the relay R shown in Fig. 1, is tuned to mechanical resonance at 148 frequency units, and the current supplied to the winding 11 is 150 frequency units.

I will now assume that the circuit A of Fig. 1 is operating at the frequency of point P in Fig. 4. The characteristics of the circuit will then be as illustrated in Fig. 5, where the inductive reactance of the coil C when plotted against frequency as indicated by the line marked $+X_L$ of C, and the net condensive reactance of the relay R is shown by the curve marked $-X_C$ of R. The total circuit reactance is then the difference between the two solid line curves, and is indicated by the curve B shown in dash lines. This curve B shows two very desirable characteristics: First, approximate reactance neutralization occurs over a narrow frequency band indicated by D, which is a band such as may occur in practice due to variations in the frequency of commercial alternating current. Second, sharp increase in reactance at other frequencies, especially those lower than the band D, and which are the ones usually giving more trouble than the higher ones by producing undesired action of the vibrating electromagnetic device.

To provide a vibrating device possessing these characteristics may require that it be operated not exactly on its apparent resonant point, but the deviation will be of such an order that the response will be quite large, probably 80% or more of that at apparent resonance. The deviation is also in such a direction that there is a saving in hysteric loss over that of apparent resonance, so that actually the response may be as large or larger for a given amount of power supply. The main advantages of my invention are obtained by so designing the vibrating device that its condensive reactance neutralizes the inductive reactance of the remainder of the circuit, and that its operative frequency is chosen at such point on the impedance circle that condensive reactance due to motion of the device and the inductive reactance of the remainder of the circuit increase at the same rate.

My invention, therefore, provides a simplification of the usual tuned circuit by eliminating the tuning condenser, and it also improves the characteristic of this circuit in two ways: First, by providing better reactance neutralization over a frequency band, such as is found in commercial variations of alternating current supply, than can be done by a static condenser; and second, by making the increase of reactance at other frequencies, especially lower ones, much sharper than can be attained with static tuning.

Referring now to Figs. 6, 7 and 8, I have here illustrated the power required for a vibrating relay when tuned with its own capacity, as contrasted with the power required by a vibrating relay circuit of the same proportional inductance and resistance tuned with a static condenser. The circuit illustrated in Fig. 6 is the circuit A of Fig. 1, while the circuit illustrated in Fig. 7 is a series tuned circuit of the usual type, comprising a coil C, a condenser 23, and a vibrating electromagnetic relay designated R'. These circuits are so adjusted that the ratio of total inductance to total resistance is the same in the two circuits. For convenience I have designated the circuit shown in Fig. 6 as circuit 1, and the circuit shown in Fig. 7 as circuit 2.

The motional impedance of relay R' in circuit 2 is considered constant over the frequency range considered, the tuning being accomplished entirely by the static condenser 23.

An inspection of the two curves in Fig. 8 shows a very much sharper resonance curve for the circuit tuned with the motional capacity of the relay R. From 134 to 138 frequency units both curves show a power input of 480 power units or greater, but at 5 frequency units lower, that is, 129 units, the static condenser tuned relay takes 450 divided by 480 or 93.8% of this power, while the relay tuned by its motional reactance takes only 125 divided by 480 or 26% of the power taken at a frequency 5 units higher. The cut-off effects may thus be compared at this point by the ratio 93.8 divided by 26 or 3.6. This means that at 5 frequency units below the operating range circuit 1 is 3.6 times sharper than circuit 2. At a point 5 frequency units above the operating range, that is, 143 cycles, the difference is even more marked. For circuit 1 the power ratio at 143 frequency units as against 138 frequency units divided by 480 or 1.04%, while for circuit 2 the power ratio is 455 divided by 480 or 94.8%, so that the sharpness ratio is 94.8 divided by 1.04 which is 91. That is to say, at 5 frequency units above the operating range, circuit 1 cuts off 91 times sharper than circuit 2.

The shaded area between the two curves is a measure of the increased liability of circuit 2 over circuit 1 to false operation by foreign currents in a train control system of the type shown in Fig. 1.

Although I have herein shown and described only one form of apparatus embodying my invention, it is understood that various changes and modifications may be made therein within the scope of the appended claims without departing from the spirit and scope of my invention.

Having thus described my invention, what I claim is:

1. An electric circuit including an electro-responsive device adjusted for motional capacity, and an inductive reactance substantially equal to the motional capacity reactance of said device.

2. An inductive circuit including an electro-responsive device adjusted for motional capacity reactance substantially equal to the inductive reactance of the remainder of the circuit.

3. An electric circuit including a vibrating electro-responsive device, and inductive reactance substantially equal to the net capacity reactance produced by the motional capacity of said device.

4. An inductive circuit including a vibrating electro-responsive device so designed that at a given frequency its motional condensive reactance substantially neutralizes the inductive reactance of the circuit.

5. An inductive circuit including a vibrating electro-responsive device so designed that at a given frequency the motional condensive reactance of the device substantially neutralizes the inductive reactance of the circuit, and that the condensive reactance of the device and the inductive reactance of the remainder of the circuit increase at substantially the same rate.

6. An electric circuit including a vibrating electromagnetic device, the inherent reactance of which maintains the total reactance of the circuit substantially constant with variation in frequency through a given range.

7. An electric circuit including a vibrating electromagnetic device, the inherent reactance of which maintains the total reactance of the circuit substantially zero with variation in frequency through a given range.

8. An electric circuit including a vibrating electromagnetic device, the inherent condensive reactance of which as produced by its motional capacity substantially neutralizes the net inductive reactance of the remainder of the circuit.

9. An electric circuit including a vibrating electromagnetic device so designed that its inherent condensive reactance combined with the net reactance of the remainder of the circuit provides substantial reactance neutralization through a given band of operating frequencies.

10. An electrical circuit including a coil which is inductively supplied with alternating energy, and a vibrating electromagnetic device, said coil and device being so proportioned that the total reactance of the circuit at a given frequency is substantially zero.

11. An electrical circuit including a coil which is inductively supplied with alternating energy, and a vibrating electromagnetic device, said coil and device being so proportioned that the total reactance of the circuit is substantially neutralized at all frequencies in a given operating range.

12. An electrical circuit including a coil which is inductively supplied with alternating energy, and a vibrating electromagnetic device, said coil and device being so proportioned that the total reactance of the circuit is substantially neutralized at frequencies within a given operating range and increases sharply at frequencies above and below said range.

13. In combination, a train carried circuit including a coil and a vibrating electromagnetic device, and means located in the trackway for supplying alternating current to said coil inductively, said coil and relay being so proportioned that the total reactance of the circuit is substantially zero at the frequency of said alternating current.

14. An electric circuit supplied at times with an alternating current and including a vibrating electro-responsive device tuned mechanically to a frequency slightly lower than that of said alternating current, whereby when said device is operating it has a motional capacity reactance which neutralizes at least part of the inductive reactance of the remainder of the circuit.

15. An electric circuit supplied at times with an alternating current and including a vibrating electro-responsive device tuned mechanically to such frequency with respect to the frequency of said current that when the device is operating its motional capacity reactance substantially neutralizes the net reactance of the remainder of the circuit.

16. An electric circuit including a coil which is at times supplied inductively with alternating current, and a vibrating electromagnetic device tuned mechanically to such frequency with respect to the frequency of said current that when the device is operating its motional reactance substantially neutralizes the net reactance of said coil and the remaining parts of the circuit.

17. An electric circuit supplied at times with an alternating current and including a vibrating electro-responsive device tuned mechanically to such frequency with respect to the frequency of said current that when the device is operating its inherent reactance substantially neutralizes the net reactance of the remainder of the circuit.

In testimony whereof I affix my signature.

PAUL N. BOSSART.